(12) United States Patent
Berry et al.

(10) Patent No.: US 6,738,977 B1
(45) Date of Patent: May 18, 2004

(54) CLASS SHARING BETWEEN MULTIPLE VIRTUAL MACHINES

(75) Inventors: Robert F. Berry, Braishfield (GB); Donna N. Dillenberger, Yorktown Heights, NY (US); Elizabeth A. Hutchison, Winchester (GB); Susan P. Paice, Eastleigh (GB); Donald W. Schmidt, Stone Ridge, NY (US); Alan M. Webb, Ridgefield, CT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/584,151

(22) Filed: May 31, 2000

(51) Int. Cl.⁷ .................................................. G06F 9/00
(52) U.S. Cl. .......................................... 719/332; 718/1
(58) Field of Search .................. 709/332; 717/145–148, 717/166

(56) References Cited

U.S. PATENT DOCUMENTS

| | | | | |
|---|---|---|---|---|
| 5,950,008 | A | * | 9/1999 | van Hoff ..................... 717/139 |
| 6,405,367 | B1 | * | 6/2002 | Bryant et al. ................ 717/115 |
| 6,519,594 | B1 | * | 2/2003 | Li ............................... 707/10 |

FOREIGN PATENT DOCUMENTS

EP           0962860        8/1999    ............. G06F/9/46

OTHER PUBLICATIONS

Dillenberger et al, "Building a Java virtual machine for server applications: The Jvm on OS/390," Jan. 2000, IBM Systems Journal, vol. 39, No. 1—Java Performance.*

U.S. patent application Ser. No. 09/304,160, Aman et al., filed Apr. 30, 1999.
"Building a Java virtual machine for server application: The Jvm on OS/390" by D Dillenber et al, IBM Systems Journal, vol. 39, No. 1—Java Performance, Jan. 2000.
oracle.com/java/index.html?server.html, Apr. 11, 2000.
"Delivering the Promise of Internet Computing: Integrating Java with Oracle8i", an Oracle Technical white Paper, Apr. 1999.
Oracle JServer Enterprise Edition, Technical Data shhet, May 1999.
Oracle JServer Technical Data Sheet, May 1999.
Oracle JServer Scalability and Performance, by Jeremy Lizt, Java Products Team, Jul. 9, 1999.
Oracle JServer, Features overview, May 1999.

* cited by examiner

*Primary Examiner*—Meng-Al T. An
*Assistant Examiner*—Li B. Zhen
(74) *Attorney, Agent, or Firm*—Scully, Scott, Murphy & Presser; Daniel P. Morris, Esq.

(57) ABSTRACT

A system includes first and second virtual machines (VM) representing a master and a client respectively. A class file is loading by the first virtual machine into shared memory. The class file includes sharable and non-sharable data, and also references sharable and non-sharable data (including code). When it is desired to load the same class into the second virtual machine, the class is first located within said shared memory. A mirror copy of the class is then formed within private memory in the second virtual machine. Finally the non-sharable data of the class is completed in the private memory. Thereafter, an application in the second virtual machine can utilise the class on the basis of the sharable data in the shared memory of the first virtual machine, and the non-sharable data from the private memory of the second virtual machine.

31 Claims, 5 Drawing Sheets

CLASS SHARING BETWEEN MULTIPLE VIRTUAL MACHINES

FIELD OF THE INVENTION

The present invention relates to sharing classes between first and second virtual machines, and in particular to a way in which a class loaded into a first virtual machine can be shared with a second virtual machine.

BACKGROUND OF THE INVENTION

Programs written in the Java programming language (Java is a trademark of Sun Microsystems Inc) are generally run in a virtual machine environment, rather than directly on hardware. Thus a Java program is typically compiled into byte-code form, and then interpreted by the Java virtual machine (JVM) into hardware commands for the platform on which the JVM is executing. The JVM itself is an application running on the underlying operating system. An important advantage of this approach is that Java applications can run on a very wide range of platforms, providing of course that a JVM is available for each platform.

Java is an object-oriented language. Thus a Java program is formed from a set of class files having methods that represent sequences of instructions (somewhat akin to subroutines). A hierarchy of classes can be defined, with each class inheriting properties (including methods) from those classes (termed superclasses) which are above it in the hierarchy. At run-time objects are created as instantiations of these class files, and indeed the class files themselves are effectively loaded as objects. One Java object can call a method in another Java object. In recent years Java has become very popular, and is described in many books, for example "Exploring Java" by Niemeyer and Peck, O'Reilly & Associates, 1996, USA, and "The Java Virtual Machine Specification" by Lindholm and Yellin, Addison-Wedley, 1997, USA.

The standard JVM architecture generally supports only a single application, although this can be multi-threaded. In a server environment used for database transactions and suchlike, each transaction is typically performed as a separate application, rather than as different threads within an application. This is to ensure that every transaction starts with the JVM in a clean state. In other words, a new JVM is started for each transaction (i.e. for each new Java application). Unfortunately however this results in an initial delay in running the application (the reasons for this will be described in more detail later). The overhead due to this frequent starting and then stopping of JVMs as successive transactions are processed is therefore significant, and seriously degrades the scalability of Java server solutions.

Various attempts have been made to mitigate this problem. EP-962860-A describes a process whereby one JVM can fork into a parent and a child process, this being quicker than setting up a fresh JVM. Another approach is described in "Oracle JServer Scalability and Performance" by Jeremy Litzt, July 1999 (see: oracle.com/database/documents/jserver_scalabilit y_and_performance_twp.pdf). Thus the JServer product available from Oracle Corporation, USA, supports the concept of multiple sessions (a session effectively representing a transaction or application), each session including a JServer session. Resources such as read-only bytecode information are shared between the various sessions, but each individual session appears to its JServer client to be a dedicated conventional JVM.

U.S. patent application Ser. No. 09/304160, filed Apr. 30, 1999 ("A Long Running Reusable Extendible Virtual Machine"), assigned to IBM Corporation, discloses a virtual machine (VM) having two types of heap, a private heap and a shared heap. The former is intended primarily for storing application classes, whilst the latter is intended primarily for storing system classes and, as its name implies, is accessible to multiple VMs. The idea is that as each new VM is launched, it can access system classes already in the shared heap, without having to reload them, relink them, and so on, thereby saving significantly on start-up time. The shared memory can also be used for storing application classes that will be used by multiple VMs, with the private heap then being used for object instances specific to a particular application running on a VM. At termination of a VM its private heap is deleted, but the shared heap persists and remains available to other VMs.

A related idea is described in "Building a Java virtual machine for server applications: the JVM on OS/390" by Dillenberger et al, IBM Systems Journal, Vol 39/1, January 2000. This describes two types of JVM, a resource-owning JVM which loads and resolves necessary system classes, and subsequent "worker" JVMs which can reuse the resolved classes. Again this implementation uses a shared heap to share system and potentially application classes for reuse by multiple workers, with each worker JVM also maintaining a private or local heap to store data private to that particular JVM process. It is suggested that worker JVMs use a common class loader to share name spaces across a set of JVMs.

However, one problem here is that a worker JVM may potentially delete all references to a class loader, which is the owner of some or all of the commonly loaded classes. This makes the loader unreachable, so that it and its classes may be garbage collected, for subsequent reloading and initialisation. Unfortunately, this is not compatible with the fact that the class loader and the classes it has loaded are effectively shared between a number of JVMs.

SUMMARY OF THE INVENTION

Accordingly, the present invention provides a method of operating a system including first and second virtual machines and having a shared memory accessible to both said first and second virtual machines, the method comprising the steps of:

loading a class within the first virtual machine =into said shared memory, said class having sharable and non-sharable data associated therewith; loading the class into the second virtual machine by locating the class within said shared memory; forming a mirror of the class within a private memory in the second virtual machine; and completing the non-sharable data associated with the class in said mirror; and utilising the class in the second virtual machine on the basis of the sharable data from the shared memory of the first virtual machine, and the non-sharable data from the private memory of the second virtual machine.

The invention provides a master (first) virtual machine and at least one client (second) virtual machine running in parallel on the same computer system. Certain resources from the master virtual machine can be shared with the client virtual machine, thereby greatly improving efficiency. In particular the client virtual machine does not generally have to load classes already loaded by the master virtual machine. However, in accordance with the present invention it is realised that this sharing cannot be complete because certain class properties (eg initialisation status—see below) may need to be set individually on each virtual machine. Thus for each class to be shared, a mirror version is created on a client virtual machine. The mirror version of the class is effectively a composite in that certain class data is stored locally on the client virtual machine, whilst other class data is actually shared with the copy of the class loaded into shared memory by the first virtual machine. It will be appreciated that overall the mirror version contains essentially the same data elements as the original class in the first virtual machine (since both are derived ultimately from the same class file). Those elements for which the master and client will contain identical data can be shared, and only a single copy in the master need be maintained. Those elements which either do or are liable to contain different data in the client from the master must be present locally in the mirror itself. It will be appreciated therefore that the mirror is not a strict duplicate of the class loaded into the master. Rather it is the same class loaded into a different virtual machine (and so may have different data element values, etc), but which reuses certain data from the class as loaded into the master virtual machine.

The use of the mirror or shell version means that a class which has previously been loaded into the master virtual machine can beloaded much more quickly into the client virtual machine than if it had to be loaded completely afresh. Thus firstly only the non-shared data needs to be stored into the second virtual machine, and secondly even this non-shared data can be derived from the class in the first virtual machine or produced internally by the second virtual machine (in other words no need to go back to the class file somewhere in external storage). At the same time the creation and presence of the mirror class makes it transparent that the class has not in fact been loaded conventionally.

A typical configuration for the above approach is to have a single master and multiple clients. In such an arrangement, the clients generally perform most of the work, to minimise any risk of the master falling over (which would then render the shared data unavailable, and essentially invalidate all the mirror classes). It is also convenient with this approach for garbage collection to be disabled on the master virtual machine.

In the preferred embodiment the step of loading the class into the second virtual machine further includes updating a class loader cache in the second virtual machine. This further emulates conventional class loading.

Generally the first and second virtual machines both include a hierarchy of class loaders. At least one class loader can be designated a shared class loader. Each shared class loader in the class loader hierarchy in the second virtual machine has a corresponding shared class loader in the equivalent position in the class loader hierarchy in the first virtual machine. This helps to ensure conformity, for example in terms of security, between the original version of the class in the first virtual machine, and the mirror version in the second virtual machine. In order to maintain this situation, in the preferred embodiment, before creating a shared class loader in the second virtual machine, it is checked that an instance of the shared class loader does not already exist on the second virtual machine, and that there is a corresponding shared class loader in the first virtual machine.

Note that a shared class loader in the first virtual machine does not necessarily have to have a counterpart in the second virtual machine—only in this case classes loaded by this shared class loader will not be available for sharing with the second virtual machine. In addition, the master and client virtual machines can have non-shared class loaders which operate in conventional fashion.

In the preferred embodiment a shared class is loaded into the second virtual machine by walking the class loader hierarchy on the second virtual machine to determine for each class loader in the hierarchy whether it has previously loaded the class. This determination is performed (as conventionally) on the basis of said class loader cache in the second virtual machine. If the class has not been previously loaded and is to be loaded by a shared class loader, it is then determined whether the class has been loaded into shared memory on the first virtual machine (this can be done most simply by checking the class loader cache on the master). If it is determined that the class has not been loaded into shared memory on the first virtual machine, the client causes the class to be loaded into the shared memory of the first virtual machine. Once this has been performed, a mirror version of this class can then be created on the second virtual machine.

In the preferred embodiment the non-sharable data associated with the mirror version of the class includes an identifier of the class loader which loaded the class (into the second virtual machine) and an initialisation flag. The initialisation flag in the non-sharable data is set to the non-initialised state when the class is first loaded into the second virtual machine. This provides separate initialisation of the class in each virtual machine in accordance with standard environment requirements. The non-sharable data associated with the mirror version of the class further includes at least part of the method block and field data associated with the class. The exact amount of data which needs to be mirrored is dependent on precise virtual machine implementation and platform considerations. In the preferred embodiment for simplicity all of the method block and field data are mirrored, even although typically this is not strictly required for all fields. In contrast the (non-native) method code is included in the sharable data associated with the class and so only stored in the first virtual machine (i.e. no mirrored version in the second virtual machine). This is because the second virtual machine can use this method code directly from the shared memory, and does not need its own copy.

Preferably the method further comprises the steps of de-referencing all the mirrors of classes loaded into the second virtual machine by a particular shared class loader on that machine; and allowing the particular shared class loader to be garbage collected on the second virtual machine. In other words a class loader and associated classes can be effectively removed from the second virtual machine, even whilst the original version of the classes may still be present in the first virtual machine.

It will be appreciated that all the above operations, such as for locating and creating the mirror class, for monitoring shared class loaders, and so on, are essentially transparent to the application and the class loaders (at the application level). Rather they are performed by the underlying virtual machine implementation. Thus from the perspective of the application, the dependence of the client on the master is largely hidden, and the second virtual machine behaves effectively as a standalone system.

The invention further provides a computer program product, comprising computer program instructions typically recorded onto a storage medium or transmitted over a network, for implementing the above methods.

The invention further provides a computing system including first and second virtual machines and having a shared memory accessible to both said first and second virtual machines, the system further comprising:
  means for loading a class within the first virtual machine into said shared memory, said class having sharable and non-sharable data associated therewith;
  means for loading the class into the second virtual machine by locating the class within said shared memory; means for forming a mirror of the class within a private memory in the second virtual machine; and means for completing the non-sharable data associated with the class in said mirror; and means for utilising the class in the second virtual machine on the basis of the sharable data from the shared memory of the first virtual machine, and the non-sharable data from the private memory of the second virtual machine.

The invention further provides a computing system including:

a first virtual machine;

a second virtual machine;

a shared memory accessible to both said first and second virtual machines;

a private memory accessible to the second virtual machine;

at least one class loaded in the first virtual machine into said shared memory, said class having sharable and non-sharable data associated therewith; a mirror of said at least one class loaded in the second virtual machine into said private memory, said mirror including the non-sharable data associated with the at least one class;

wherein the at least one class is utilised by the second virtual machine on the basis of the sharable data from the shared memory of the first virtual machine, and the non-sharable data from the private memory of the second virtual machine.

BRIEF DESCRIPTION OF THE DRAWINGS

A preferred embodiment of the invention will now be described in detail by way of example only with reference to the following drawings.

DETAILED DESCRIPTION

Figure 1:
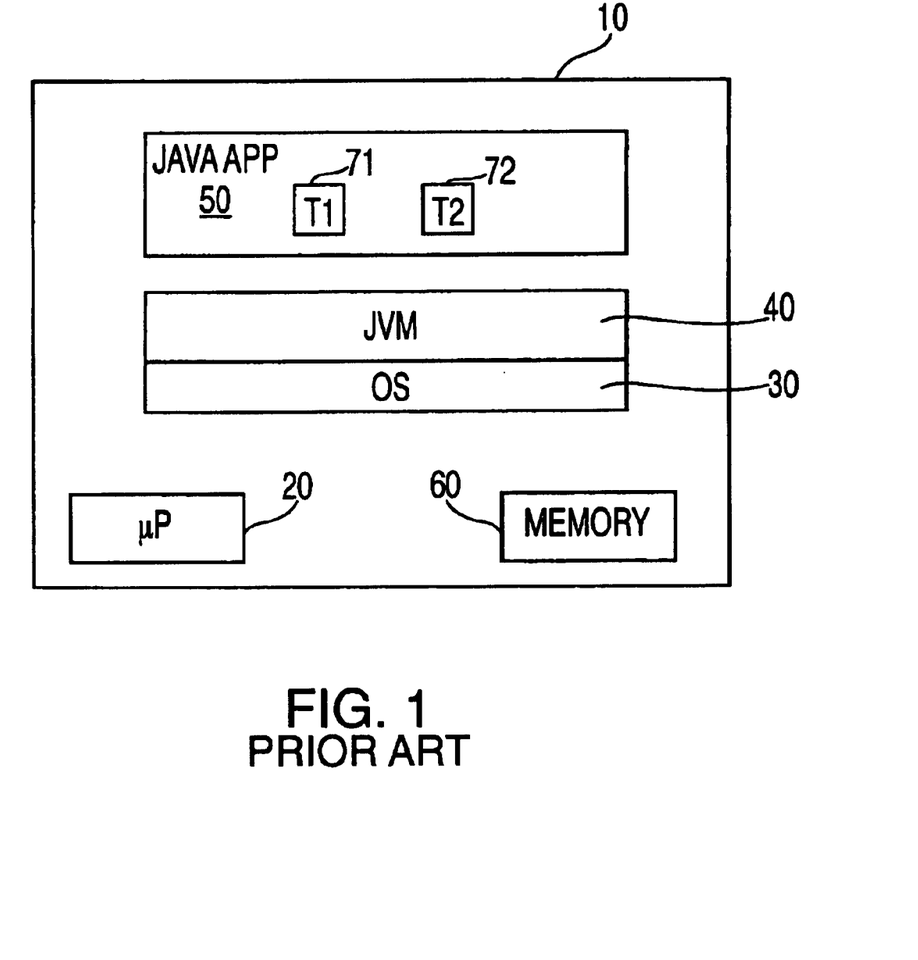
FIG. 1 shows a schematic diagram of a computer system supporting a Java Virtual Machine (JVM)

FIG. 1 illustrates a computer system 10 including a (micro)processor 20 which is used to run software loaded into memory 60. The software can be loaded into the memory by various means (not shown), for example from a removable storage device such as a floppy disc or CD ROM, or over a network such as a local area network (LAN) or telephone/modem connection, typically via a hard disk drive (also not shown). Computer system runs an operating system (OS) 30, on top of which is provided a Java virtual machine (JVM) 40. The JVM looks like an application to the (native) OS 30, but in fact functions itself as a virtual operating system, supporting Java application 50. A Java application may include multiple threads, illustrated by threads T1 and T2 71, 72.

It will be appreciated that computer system 10 can be a standard personal computer or workstation, minicomputer, mainframe, or any other suitable computing device, and will typically include many other components (not shown) such as display screen, keyboard, sound card, network adapter card, etc which are not directly relevant to an understanding of the present invention. Note that computer system 10 may also be an embedded system, such as a set top box, handheld device, or any other hardware device including a processor 20 and control software 30, 40.

It will also be appreciated that in a typical server environment, multiple JVMs may be running on computer system 10, each running an application representing, for example, a single database transaction.

Figure 2:
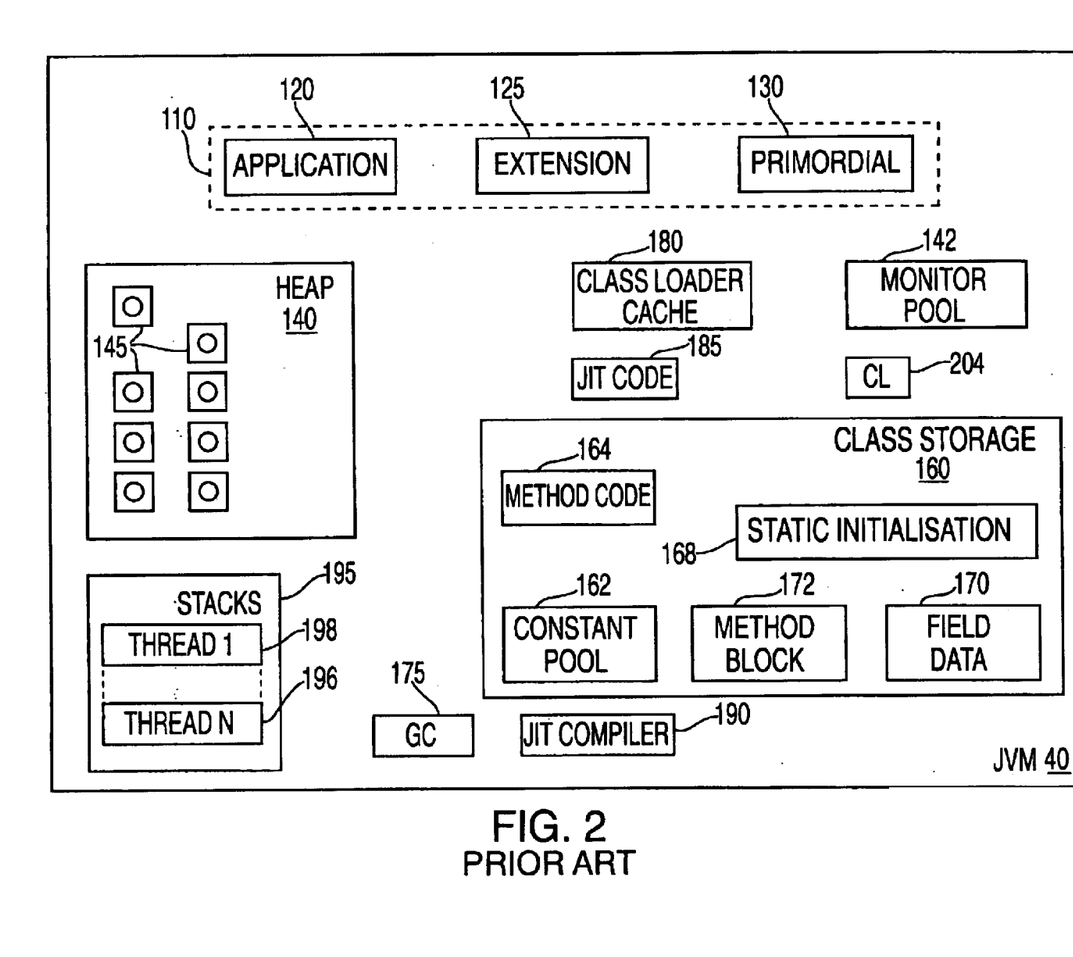
FIG. 2 illustrates-some internal components of the JVM.

FIG. 2 shows the structure of JVM 40 in more detail (largely omitting those components which are not directly pertinent to an understanding of the present invention). The fundamental unit of a Java program is the class, and thus in order to run any application the JVM must first load the classes forming and required by that application. For this purpose the JVM includes a hierarchy of class loaders 110, which conventionally includes three particular class loaders, named Application 120, Extension 125, and Primordial 130. An application can add additional class loaders to the JVM (a class loader is itself effectively a Java program), and these are included in the hierarchy shown in FIG. 2.

For each class included within or referenced by a program, the JVM effectively walks up the class loader hierarchy, going first to the Application class loader, then the Extension class loader, and finally to the Primordial class loader, to see if any class loader has previously loaded the class. If the response from all three class loaders is negative, then the JVM walks back down the hierarchy, with the Primordial class loader first attempting to locate the class, by searching in the locations specified in its class path definition. If this is unsuccessful, the Extension class loader then makes a similar attempt, and if this fails the Application class loader then tries to load the class from one of the locations specified in its class path (if this fails, or if there are any other problems such as a security violation, the system returns an error). It will be appreciated that a different class path can be defined for each class loader.

The JVM further includes a component CL 204, which also represents a class loader unit, but at a lower level. In other words, this is the component that actually interacts with the operating system to perform the class loading on behalf of the different (Java) class loaders 110.

The JVM also includes a heap 140, which is shared between all threads, and is used for storage of objects 145. Each loaded class represents an object, and therefore can be found on the heap. In Java a class file effectively defines a type of object, and this is then instantiated one or more times in order to utilise the object. Each such instance is itself an object which can be found in heap 140. Thus the objects 145 shown in the heap in FIG. 2 may represent class objects or other object instances. (Note that strictly the class loaders as objects are also stored on heap 140, although for the sake of clarity they are shown separately in FIG. 2).

The JVM further includes a class storage area 160, which is used for storing information relating to the class files in the heap 140. This area includes the method code region 164 for storing byte code for implementing class method calls, and a constant pool 162 for storing strings and other constants associated with a class. The class storage area also includes a field data region 170 for sharing static variables (static in this case implies shared between all instances of a class), and an area 168 for storing static initialisation methods and other specialised methods (separate from the main method code 164). The class storage area further includes a method block area 172, which is used to stored information relating to the code, such as invokers, and a pointer to the code, which may for example be in method code area 164, in JIT code area 185 (as described in more detail below), or loaded as native code such as C, for example as a dynamic link library (DLL).

Classes stored as objects 145 in the heap 140 contain a reference to their associated data such as method byte code etc in class storage area 160. They also contain a reference to the class loader which loaded them into the heap, plus other fields such as a flag to indicate whether or not they have been initialised.

The JVM further includes a storage area for just-in time (JIT) code 185, equivalent to method byte code which has already been compiled into machine code to be run directly on the native platform. This code is created by the JVM from Java byte code by a compilation process using JIT compiler 190, typically when the application program is started up or when some other usage criterion is met, and is used to improve run-time performance by avoiding the need for this code to be interpreted later.

Another component of the JVM is the stack area 195, which is used for storing the stacks 196, 198 associated with the execution of different threads on the JVM. Note that because the system libraries and indeed parts of the JVM itself are written in Java, and these frequently use multi-threading, the JVM may be supporting multiple threads even if the user application 50 running on top of the JVM contains only a single thread itself.

Also included within JVM are class loader cache 180 and garbage collection (GC) unit 175. The former is effectively a table used to allow a class loader to trace those classes which it initially loaded into the JVM. The class loader cache therefore allows each class loader to check whether it has loaded a particular class—part of the operation of walking the class loader hierarchy described above. Note also that it is part of the overall security policy of the JVM that classes will typically have different levels of permission within the system based on the identity of the class loader by which they were originally loaded.

Garbage collection unit 175 is used to delete objects from heap 140 when they are no longer required. Thus in the Java programming language, applications do not need to specifically request or release memory, rather this is controlled by the JVM itself. Therefore, when Java application 120 creates an object 145, the JVM secures the requisite memory resource. Then, when the Java application finishes using object 145, the JVM can delete the object to free up this memory resource. This latter process is known as garbage collection, and is generally performed by briefly interrupting all threads 196, 198, and scanning the heap 140 for objects which are no longer referenced, and hence can be deleted. The details of garbage collection vary from one JVM implementation to another, but typically GC is scheduled when the heap is nearly exhausted and so there is a need to free up space for new objects.

In general, a class will not be garbage collected by the JVM unless its class loader is deleted, and unless the class is no longer executing (i.e. no longer referenced from the stack 195 or from another location such as the class cache or another object). Note that the destruction of a class loader (or more accurately, the deletion of all references to the class loader) is in fact a relatively straightforward operation, since it is simply an instance of a class, and can always be reinstantiated. Such deletion is accompanied by the removal of all relevant entries in the class loader cache. The destruction of a class loader is desirable in some instances, because it then allows any class files loaded by that class loader to be reloaded and reinitialised.

Finally, FIG. 2 shows a monitor pool 142, which is used for storing a set of locks (monitors) which are used to control contention to an object by different threads at times when exclusive access to the object is required.

Figure 3:
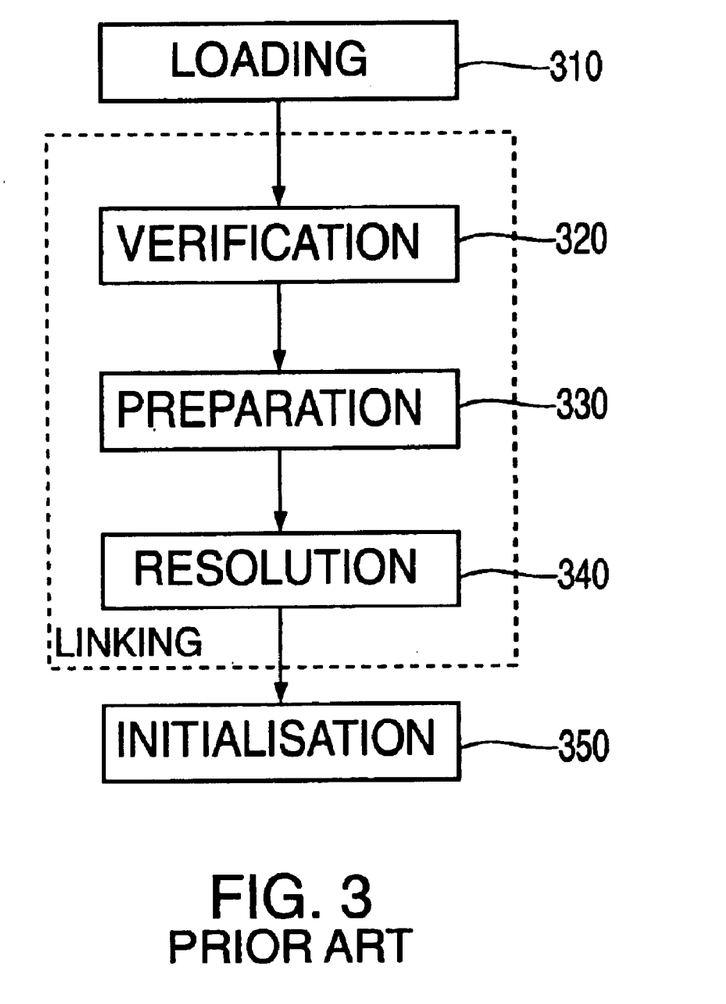
FIG. 3 is a flowchart depicting the steps required to load a class and prepare it for use.

FIG. 3 is a flowchart illustrating the operations conventionally performed to start running a Java application. The first operation is loading (step 310) in which the various class loaders try to retrieve and load a particular class. The next operation is linking, which comprises three separate steps. The first of these is verification (step 320), which essentially checks that the code represents valid Java programming, for example that each instruction has a valid operational code, and that each branch instruction goes to the beginning of another instruction (rather than the middle of an instruction). This is followed by preparation (step 330) which amongst other things creates the static fields for a class. The linking process is completed by the step of resolution, in which a symbolic reference to another class is typically replaced by a direct reference (step 340).

At resolution the JVM may also try to load additional classes associated with the current class. For example, if the current class calls a method in a second class then the second class may be loaded now. Likewise, if the current class inherits from a superclass, then the superclass may also be loaded now. This can then be pursued recursively; in other words, if the second class calls methods in further classes, or has one or more superclasses, these too may now be loaded. Note that it is up to the JVM implementation how many classes are loaded at this stage, as opposed to waiting until such classes are actually needed before loading them.

The final step in FIG. 3 is the initialisation of a loaded class (step 350), which represents calling the static initialisation method (or methods) of the class. According to the formal JVM specification, this initialisation must be performed once and only once before the first active use of a class, and includes things such as setting static (fixed) variables to their final (constant) value (see the above-mentioned book by Lindholm and Yellin for a definition of "first active use"). Note that initialisation of an object also requires initialisation of its superclasses, and so this may involve recursion up a superclass tree in a similar manner to that described for resolution. The initialisation flag in a class file 145 is set as part of the initialisation process, thereby ensuring that the class is not subsequently re-initialised.

The end result of the processing of FIG. 3 is that a class has been loaded into a consistent and predictable state, and is now available to interact with other classes. In fact, typically at start up of a Java program and its concomitant JVM, some 1000 objects are loaded prior to actual running of the Java program itself. This gives some idea of the initial delay and overhead involved in beginning a Java application.

Figure 4:
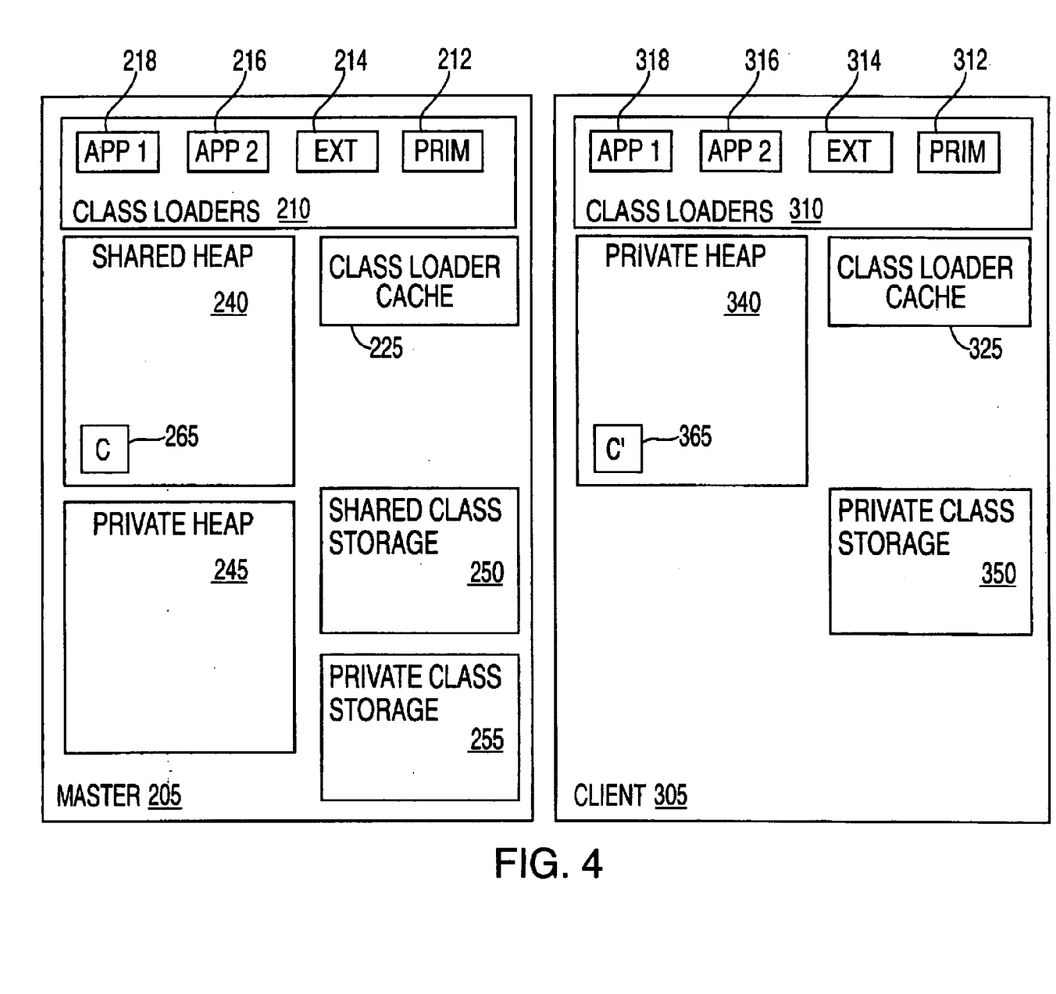
FIG. 4 shows a schematic diagram of a master JVM and a client JVM in a preferred embodiment of the invention.

FIG. 4 illustrates an architecture in accordance with a preferred embodiment of the present invention which addresses this problem. In this architecture there is a master JVM 205, and one or more client JVMs 305 (FIG. 4 shows only one client JVM associated with the master JVM, but typically there will be many more). The master and client JVMs represent standard JVMs, except as will now be described (note that some of the details of standard JVM componentry shown in FIG. 2 are omitted from FIG. 4 in order to enhance clarity of those aspects of particular relevance to an understanding of the present invention).

The master JVM and client JVM each include the same set of class loaders 210, 310. This includes one more class loader than shown in FIG. 2, in that there are now two application loaders (App1, App2; 216, 218, 316, 318). The motive for this additional class loader will be described below, although it will be appreciated that the invention may be implemented with fewer or more class loaders. Each JVM also has a class loader cache 225, 325, which as before is used to map from a particular class loader to the classes that it has loaded.

The master and the client JVMs both include a heap and a class storage area. However, in the former case the heap is divided into a shared heap 240 and a private heap 245; similarly the class storage area is divided into a shared area 250 and a private area 255. In contrast, the client JVM has just a private heap 340 and a private class storage area 350. A private heap and class storage are only accessible from within their own JVM, whereas the shared heap and shared class storage of the master JVM are placed in a memory location which is accessible to all the client JVMs associated with that master JVM. Included within the shared heap in the master JVM is a class file 265, which is mirrored by class file 365 within the private heap on the client JVM. These will be described in more detail below.

The system shown in FIG. 4 is started by invoking a JVM with a run-time option to indicate that it is to become a master JVM. The JVM then returns a token which can be used for subsequent invocations of client JVMs. The token effectively represents a pointer which allows the client JVMs to determine the location of the shared heap and class storage in the master JVM. The master JVM then loads the necessary system and application classes. This is performed in the same manner as described in relation to FIG. 2, except that each class loader in the master JVM can be specified as shared or private. In the former case the classes are loaded into the shared heap and class storage, in the latter case they are loaded into the private heap and storage.

In the preferred embodiment by default the class loaders are all shared, except for one of the application class loaders. It will be appreciated that this allows a user to control which classes go into the shared and local heaps, simply by altering the class path definitions of the class loaders and/or the locations of the class files. Note that no changes to the application code itself are required. Typically the master JVM will then load all the system and application classes required, for example for transaction processing, into shared memory, thereby avoiding the need for subsequent client JVMs to perform this task. This significantly reduces the start-up time of a client JVM. After this, the master JVM should generally be left with as little as possible to perform. This is because the master JVM is the owner of the shared heap, and if it crashes, the shared heap goes down with it, and this will also bring down all the client JVMs. Note that no garbage collection is performed on the shared heap 240 of the master JVM, in order to ensure that these class files are available for future client JVMs to use.

Considering now the operation of a client JVM, this has the same mix of shared and private class loaders as the master JVM. The private class loaders operate in essentially the same way as the private class loaders in the master JVM (and analogous to a conventional class loader). However, there are important distinctions in the way in which a shared class loader operates in a client JVM, as will be apparent from the flowchart of FIG. 5. Note that there may be variations in terms of the private class loaders between the master JVM and its various clients, but the family of JVMs must all have the same shared class loaders. Moreover these must be located in the same place in the class loader hierarchy. This is necessary to ensure consistent behaviour, for example in terms of class resolution, and also for security reasons.

Figure 5:
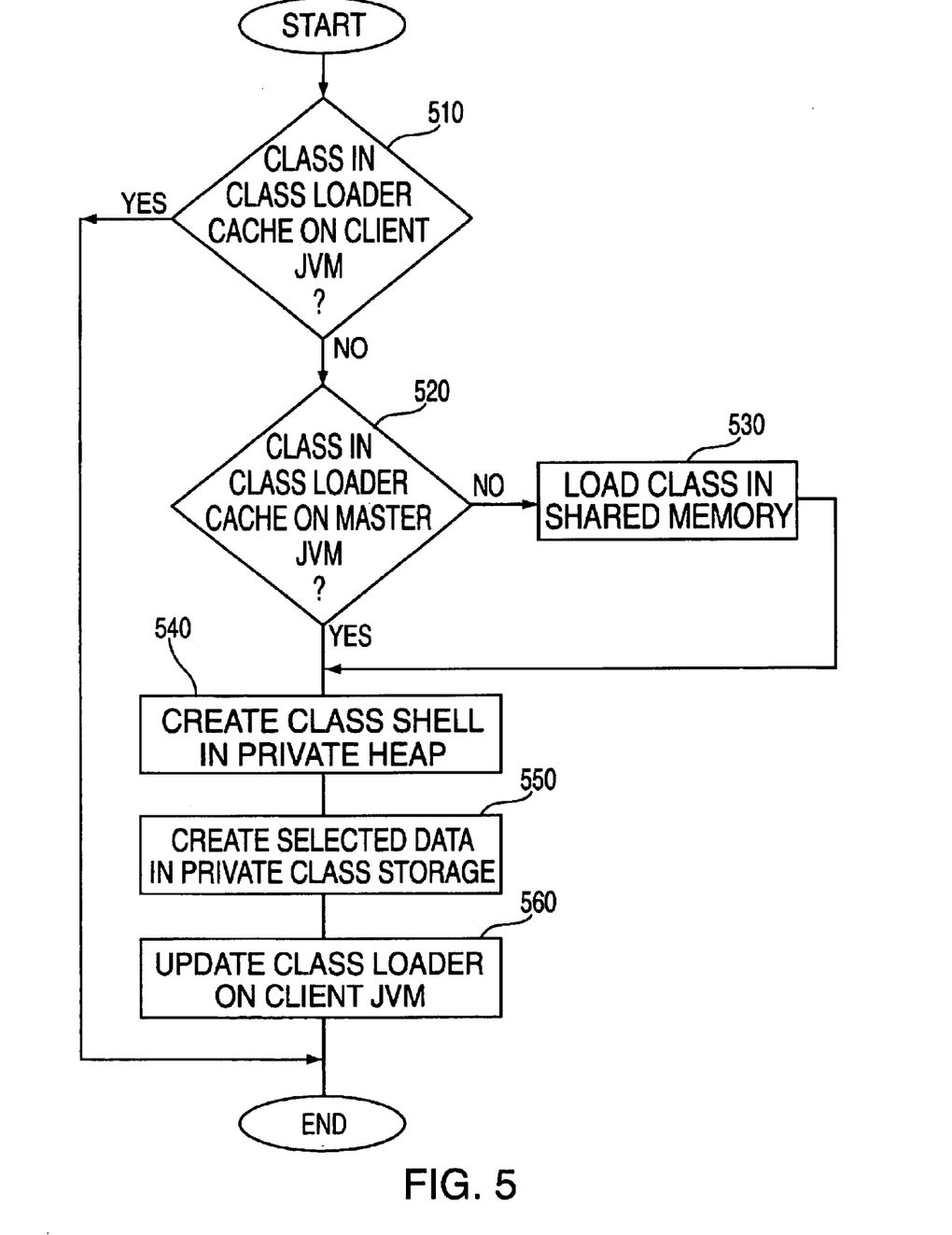
FIG. 5 is a flowchart depicting the steps required to load a class into client JVM using a shared class loader.

Turning now to FIG. 5, the first operation of the shared class loader is to check whether the requested class is present in the local class loader cache 325 on the client JVM (step 510). A positive outcome here would indicate that class has already been loaded by the class loader, and so the method can terminate. Assuming on the other hand that the class has not yet been loaded, the class loader then looks for the class in the class loader cache of them aster JVM 22S (step 520), or more particularly in that part of the class loader cache in the master JVM that corresponds to that shared class loader.

If the class is not present in the master class loader cache, then it must be loaded into the shared memory 240 of the master JVM (step 530) using a process that will be discussed in more detail later. Once this has been done, or if the class was already there (eg as class 265), the class loader creates a shell or ghost copy of the class 365 on the local heap 340 (step 540), and likewise creates certain data concerning that object corresponding to that in the shared class storage (250) (step 550) (again the details of this step will be provided below). Finally, an entry for this class is made in the class loader cache 325 on the client JVM. The class is now effectively loaded into the client JVM, and so can be linked and initialised and then utilised by the application running on the client JVM.

Note that in the simplest implementation the system walks up and down the class loader hierarchy inbetween steps 510 and 520, as described in respect of FIG. 2. However, for performance reasons it may be more efficient to go to step 520 directly after step 510, and only progress up the class loader hierarchy before step 530, although care must be taken in this case that the behaviour remains consistent with the JVM specification.

Returning now to the situation where the desired class needs to be loaded by the client JVM into shared memory (step 530), care needs to be taken to avoid conflict with any other JVM (the master or other clients) also trying to write into this memory. In the preferred embodiment, the client JVM first asks the master JVM for a global lock on a portion of shared memory to be used for storing the class, it then loads the class there, and it then notifies the master JVM which can update the class loader cache on the master JVM accordingly. Note that as a general rule it is desirable to minimise the involvement of the master JVM in such operations, firstly because it represents a potential bottleneck where many client JVMs are simultaneously in existence, and secondly because as previously indicated the master JVM is a single point of failure for the system.

An important consideration is the information from the shared heap and class storage area in the master JVM that needs to be mirrored into the private counterparts on the client JVM for each object. In general it is desirable to minimise such mirroring, in order to avoid the client JVM having to duplicate items that have already been stored by the master JVM.

The fields of object 265 that need to be created in shell object 365 during steps 540 and 550 are:

| | |
|---|---|
| loader | (a pointer to the ClassLoader instance which loaded the class) |
| init_thread | id of the thread which initializes the class |
| signers | security information |
| protection_domain | security information |
| last_subclass_of | an optimisation field specific |

| -continued | |
|---|---|
| memory_table | to a JVM implementation |
| some flags | error, initialised, mirrored, cached |

These mirrored fields can then be populated with values appropriate to the ghost class 365. For example, the initialisation flag will not be set, irrespective of the status of the initialisation flag of the class 265 in the shared memory. This then allows an initialisation to be performed on the local JVM, in accordance with the JVM specification. Note that the complete list of fields to be mirrored will be dependent on the particular JVM implementation, and may be influenced for example by how locking is performed, how garbage collection is performed, and so on.

In addition to mirrored class file 365, certain items associated with the class file need also to be copied from the shared class storage area of the master JVM to the private storage area of the client JVM, in particular, the field data and the method block. Strictly speaking not all the field data needs tone mirrored, for example final (fixed) static variables could be stored in shared memory, but in practice it is easier to keep all this data together in a mirrored block. Likewise, the requirement to mirror all of the method block is platform dependent; for example, in some operating systems all processes will share a single DLL (accessible as native code) at a single address, whilst in other systems different processes may see the DLL as being at different addresses, or indeed, multiple versions of the DLL may be loaded. In the preferred embodiment, the method block is always mirrored, thereby allowing a consistent implementation across all platforms. Note finally that the JIT code 185 can also be shared between JVMs, in other words, this does not have to be copied to the client JVMs.

The result of the above approach is that the client JVM behaves just as any conventional JVM from the perspective of the application. The only difference is the start up of this JVM is significantly quicker, in that many of the classes are already available in the shared memory of the master JVM. As mentioned above, a shared class is initialised separately for each client JVM, by virtue of the private initialisation flag stored in the shell copy of the class. Subsequent operation of the client JVM essentially follows standard JVM operations, with the exception that (transparent to the application) some of the class files and information are actually being accessed in shared memory belonging to the master JVM rather than to the client JVM itself.

In particular, locking occurs on the local copies of objects, and garbage collection is performed as normal on the client JVM One consequence of the latter is that it is possible to delete a shared class loader from a client JVM and the (shell) objects associated with it. The class loader can then be reinstantiated, allowing the objects to be reloaded and reinitialised, if this is desired.

Note that in these circumstances, it is important to maintain consistency in terms of the class loader hierarchy between the client and master JVMs. It is acceptable for a client to delete its own local instance of a shared class loader (subject to normal conditions for deleting a class loader). This would be accompanied by deletion of all its associated classes, and thus there is no scope for conflict. However, care must be taken when a new instance of the shared class loader is created on a client JVM that no inconsistency arises. In particular, for each new class loader instance on a client JVM, it is first checked that there is no existing instance of that class loader on the JVM (only one instance of a shared class loader is allowed on a client JVM). It is then checked that there is a corresponding shared class loader on the master JVM. Finally, it is confirmed that the desired new class loader has the same position in the class loader hierarchy on the client JVM as the corresponding class loader on the master JVM. This then ensures proper consistency between the client and the master in terms of resolution, security, and so on.

It will be appreciated that the skilled person will be aware of many variations on the implementation described above. For example, the preferred embodiment represents a server embodiment, but the invention is also potentially applicable to the client embodiment, such as when it is necessary to have a quick start-up of applications.

What is claimed is:

1. A method of operating a system including first and second virtual machines and having a shared memory accessible to both said first and second virtual machines, the method comprising the steps of:

loading a class within the first virtual machine into said shared memory, said class having sharable and non-sharable data associated therewith;

loading the class into the second virtual machine by locating the class within said shared memory; forming a mirror of the class within a private memory in the second virtual machine; and utilising the class in the second virtual machine on the basis of the sharable data from the shared memory of the first virtual machine, and the non-sharable data from the private memory of the second virtual machine;

wherein said step of loading the class into the second virtual machine includes updating a class loader cache in the second virtual machine; and wherein said first and second virtual machines both include a hierarchy of class loaders, at least one of which is a shared class loader, wherein each shared class loader in the class loader hierarchy in second virtual machine has a corresponding shared class loader in the equivalent position in the class loader hierarchy in the first virtual machine.

2. The method of claim 1, further comprising the steps, performed prior to creating a shared class loader in the second virtual machine, of:

checking that an instance of the shared class loader does not already exist; and checking that there is a corresponding shared class loader in the first virtual machine.

3. The method of claim 1, wherein the step of loading the class into the second virtual machine by locating the class within said shared memory comprises the steps of:

walking the class loader hierarchy on the second virtual machine to determine for each class loader in the hierarchy whether it has previously loaded the class, on the basis of said class loader cache in the second virtual machine; and where the class has not been previously loaded and is to be loaded by a shared class loader, determining whether the class has been loaded into shared memory on the first virtual machine.

4. The method of claim 3, wherein if it is determined that the class has not been loaded into shared memory on the first virtual machine, the method further comprises the step of the second virtual machine causing the class to be loaded into the shared memory of the first virtual machine.

5. The method of claim 1, wherein garbage collection is disabled on the first virtual machine.

6. The method of claim 1, wherein the non-sharable data associated with the class in said mirror includes an identifier of the class loader which loaded the class and an initialisation flag.

7. The method of claim 6, wherein the initialisation flag in the non-sharable data is set to a non-initialised state when the class is first loaded into the second virtual machine.

8. The method of claim 6, wherein the non-sharable data associated with the class in said mirror further includes at least part of a method block and field data associated with the class.

9. The method of claim 8, wherein the sharable data associated with the class includes method code.

10. The method of claim 1, further comprising the steps of:
de-referencing all the mirrors of classes loaded into the second virtual machine by a particular shared class loader on that machine; and
allowing the particular shared class loader to be garbage collected on the second virtual machine.

11. A computing system including first and second virtual machines and having a shared memory accessible to both said first and second virtual machines, the system further comprising:
means for loading a class within the first virtual machine into said shared memory, said class having sharable and non-sharable data associated therewith;
means for loading the class into the second virtual machine by locating the class within said shared memory; means for forming a mirror of the class within a private memory in the second virtual machine; and
means for utilising the class in the second virtual machine on the basis of the sharable data from the shared memory of the first virtual machine, and the non-sharable data from the private memory of the second virtual machine;
wherein said means for loading the class into the second virtual machine includes means for updating a class loader cache in the second virtual machine; and
wherein said first and second virtual machines both include a hierarchy of class loaders, at least one of which is a shared class loader wherein each shared class loader in the class loader hierarchy in second virtual machine has a corresponding shared class loader in the equivalent position in the class loader hierarchy in the first virtual machine.

12. The system of claim 11, further comprising:
means for checking that an instance of the shared class loader does not already exist; and
means for checking that there is a corresponding shared class loader in the first virtual machine, prior to creating a shared class loader in the second virtual machine.

13. The system of claim 11, wherein the means for loading the class into the second virtual machine by locating the class within said shared memory comprises:
means for walking the class loader hierarchy on the second virtual machine to determine for each class loader in the hierarchy whether it has previously loaded the class, on the basis of said class loader cache in the second virtual machine; and
means responsive to a class to be loaded by the shared class loader not being previously loaded, for determining whether the class has been loaded into shared memory on the first virtual machine.

14. The system of claim 13, wherein if it is determined that the class has not been loaded into shared memory on the first virtual machine, the second virtual machine causes the class to be loaded into the shared memory of the first virtual machine.

15. The system of claim 11, wherein garbage collection is disabled on the first virtual machine.

16. The system of claim 11, wherein the non-sharable data associated with the class in said mirror includes an identifier of the class loader which loaded the class and an initialisation flag.

17. The system of claim 16, wherein the initialisation flag in the non-sharable data is set to a non-initialised state when the class is first loaded into the second virtual machine.

18. The system of claim 16, wherein the non-sharable data associated with the class in said mirror further includes at least part of a method block and field data associated with the class.

19. The system of claim 18, wherein the sharable data associated with the class includes method code.

20. The system of claim 11, further comprising:
means for de-referencing all the mirrors of classes loaded into the second virtual machine by a particular shared class loader on that machine; and
means for allowing the particular shared class loader to be garbage collected on the second virtual machine.

21. A computing system including:
a first virtual machine;
a second virtual machine;
a shared memory accessible to both said first and second virtual machines;
a private memory accessible to the second virtual machine;
at least one class loaded in the first virtual machine into said shared memory, said class having sharable and non-sharable data associated therewith;
a mirror of said at least one class loaded in the second virtual machine into said private memory, said mirror including the non-sharable data associated with the at least one class;
wherein the at least one class is utilised by the second virtual machine on the basis of the sharable data from the shared memory of the first virtual machine, and the non-sharable data from the private memory of the second virtual machine
wherein said second virtual machine loaded with said mirror of said at least one class includes an updated class loader cache in the second virtual machine; and
wherein said first and second virtual machines both include a hierarchy of class loaders, at least one of which is a shared class loader, wherein each shared class loader in the class loader hierarchy in second virtual machine has a corresponding shared class loader in the equivalent position in the class loader hierarchy in the first virtual machine.

22. A computer program product comprising a computer readable medium including computer program instructions thereon which when executed by a computer system create first and second virtual machines, said computer system having a shared memory accessible to both said first and second virtual machines, the computer program instructions implementing a method comprising the steps of:
loading a class within the first virtual machine into said shared memory, said class having sharable and non-sharable data associated therewith;

loading the class into the second virtual machine by locating the class within said shared memory; forming a mirror of the class within a private memory in the second virtual machine; and utilising the class in the second virtual machine on the basis of the sharable data from the shared memory of the first virtual machine, and the non-sharable data from the private memory of the second virtual machine;

wherein said step of loading the class into the second virtual machine includes updating a class loader cache in the second virtual machine; and wherein said first and second virtual machines both include a hierarchy of class loaders, at least one of which is a shared class loader, wherein each shared class loader in the class loader hierarchy in second virtual machine has a corresponding shared class loader in the equivalent position in the class loader hierarchy in the first virtual machine.

23. The computer program product of claim 22, wherein said instructions further implement the steps, performed prior to creating a shared class loader in the second virtual machine, of:

checking that an instance of the shared class loader does not already exist; and checking that there is a corresponding shared class loader in the first virtual machine.

24. The computer program product of claim 22, wherein the step of loading the class into the second virtual machine by locating the class within said shared memory comprises the steps of:

walking the class loader hierarchy on the second virtual machine to determine for each class loader in the hierarchy whether it has previously loaded the class, on the basis of said class loader cache in the second virtual machine; and where the class has not been previously loaded and is to be loaded by a shared class loader, determining whether the class has been loaded into shared memory on the first virtual machine.

25. The computer program product of claim 24, wherein if it is determined that the class has not been loaded into shared memory on the first virtual machine, the computer program instructions further implement the step of the second virtual machine causing the class to be loaded into the shared memory of the first virtual machine.

26. The computer program product of claim 22, wherein garbage collection is disabled on the first virtual machine.

27. The computer program product of claims 22, wherein the non-sharable data associated with the class in said mirror includes an identifier of the class loader which loaded the class and an initialisation flag.

28. The computer program product of claim 27, wherein the initialisation flag in the non-sharable data is set to a non-initialised state when the class is first loaded into the second virtual machine.

29. The computer program product of claim 27, wherein the non-sharable data associated with the class in said mirror further includes at least part of a method block and field data associated with the class.

30. The computer program product of claim 29, wherein the sharable data associated with the class includes method code.

31. The computer program product of claim 22, wherein the instruction further implement the steps of:

de-referencing all the mirrors of classes loaded into the second virtual machine by a particular shared class loader on that machine; and allowing the particular shared class loader to be garbage collected on the second virtual machine.

* * * * *